(12) United States Patent
Shimoaka et al.

(10) Patent No.: US 10,486,511 B2
(45) Date of Patent: Nov. 26, 2019

(54) DOOR BEAM, DOOR BEAM ATTACHMENT STRUCTURE, AND METHOD FOR MANUFACTURING DOOR BEAM

(71) Applicant: Kobe Steel, Ltd., Kobe-shi (JP)

(72) Inventors: Shingo Shimoaka, Shimonoseki (JP); Narikazu Hashimoto, Shimonoseki (JP); Tsunetake Tsuyoshi, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 13 days.

(21) Appl. No.: 15/750,639

(22) PCT Filed: Aug. 1, 2016

(86) PCT No.: PCT/JP2016/072485
§ 371 (c)(1),
(2) Date: Feb. 6, 2018

(87) PCT Pub. No.: WO2017/022705
PCT Pub. Date: Feb. 9, 2017

(65) Prior Publication Data
US 2018/0236851 A1  Aug. 23, 2018

(30) Foreign Application Priority Data

Aug. 6, 2015 (JP) ................ 2015-156464
Apr. 26, 2016 (JP) ................ 2016-088540

(51) Int. Cl.
*B60J 5/04* (2006.01)
(52) U.S. Cl.
CPC ........... *B60J 5/0444* (2013.01); *B60J 5/0437* (2013.01); *B60J 5/0483* (2013.01)

(58) Field of Classification Search
CPC ..... B60J 5/0444; B60J 5/0458; B21D 22/025; B21D 5/083
(Continued)

(56) References Cited

U.S. PATENT DOCUMENTS 4,978,562 A * 12/1990 Wycech ................. B60J 5/0444
264/46.6
5,124,186 A * 6/1992 Wycech ................. B60J 5/0444
264/46.6
(Continued)

FOREIGN PATENT DOCUMENTS

DE  102015112499 A1 * 2/2017 ............ B60J 5/0429
EP  1 792 670 A1    6/2007
(Continued)

OTHER PUBLICATIONS

International Search Report dated Sep. 27, 2016 in PCT/JP2016/072485 filed Aug. 1, 2016.

*Primary Examiner* — Pinel E Romain
(74) *Attorney, Agent, or Firm* — Oblon, McClelland, Maier & Neustadt, L.L.P.

(57) ABSTRACT

A door beam including an inner flange extending in a longitudinal direction, an outer flange extending in the longitudinal direction and facing the inner flange at a distance from the inner flange, and a pair of webs connecting the inner flange and the outer flange. The inner flange has an end portion in the longitudinal direction which is made closer to an end portion of the outer flange such that the distance between the inner and outer flanges at the end portions is shorter than the distance at other portions of the inner and outer flanges.

20 Claims, 5 Drawing Sheets

(58) Field of Classification Search
USPC .................................................... 296/146.9
See application file for complete search history.

(56) References Cited

U.S. PATENT DOCUMENTS

| | | | | |
|---|---|---|---|---|
| 8,789,872 | B2 * | 7/2014 | Johansson | B60J 5/042 |
| | | | | 296/146.6 |
| 9,346,340 | B2 * | 5/2016 | Ishigame | B60J 5/0443 |
| 9,950,593 | B2 * | 4/2018 | Takagai | B60J 5/0429 |
| 2004/0189051 | A1 * | 9/2004 | Fukuchi | B60J 5/0412 |
| | | | | 296/187.12 |
| 2004/0216387 | A1 * | 11/2004 | Furuse | B60J 5/0405 |
| | | | | 49/502 |
| 2010/0084888 | A1 * | 4/2010 | Ishitobi | B60J 5/045 |
| | | | | 296/146.6 |
| 2010/0242284 | A1 * | 9/2010 | Danaj | B23K 20/06 |
| | | | | 29/897.2 |
| 2015/0123423 | A1 * | 5/2015 | Hasegawa | B60J 5/0427 |
| | | | | 296/146.6 |
| 2016/0288629 | A1 * | 10/2016 | Hu | B22D 17/00 |
| 2016/0347154 | A1 * | 12/2016 | Hodoya | B60J 5/0444 |
| 2017/0028825 | A1 * | 2/2017 | Eckart | B60J 5/0429 |

FOREIGN PATENT DOCUMENTS

| | | | | |
|---|---|---|---|---|
| JP | 9-58386 A | 3/1997 | | |
| JP | 2001-294042 A | 10/2001 | | |
| JP | 2003-118367 A | 4/2003 | | |
| JP | 2003-252056 A | 9/2003 | | |
| JP | 2015-147490 A | 8/2015 | | |
| WO | WO-2008145264 A1 * | 12/2008 | | B60J 5/0444 |
| WO | WO-2016198396 A1 * | 12/2016 | | B21D 22/025 |

\* cited by examiner

DOOR BEAM, DOOR BEAM ATTACHMENT STRUCTURE, AND METHOD FOR MANUFACTURING DOOR BEAM

CROSS-REFERENCE TO RELATED APPLICATIONS

The present application is a National Stage of International Application No. PCT/JP2016/072485, filed Aug. 1, 2016, which is based upon and claims the benefits of priority to Japanese Application No. 2015-156464, filed Aug. 6, 2015 and to Japanese Application No. 2016-088540, filed Apr. 26, 2016. The entire contents of all of the above applications are incorporated herein by reference.

TECHNICAL FIELD

The present invention relates to a door beam attached to an inner panel of a door of a vehicle, a door beam attachment structure, and a method for manufacturing a door beam.

BACKGROUND ART

A door beam comprising an aluminum alloy extruded member generally has a pair of flanges (an outer flange arranged outward in a vehicle body width direction and an inner flange arranged inward in a vehicle body width direction) and a pair of webs connecting both the flanges. The door beam is arranged between an outer panel and an inner panel of a vehicle door so that a longitudinal direction of the door beam may be directed in an anteroposterior direction of a vehicle body and an end of the door beam is attached to the inner panel directly without a bracket or through a bracket. On this occasion, a partial region of the door beam in the longitudinal direction may sometimes be press-formed beforehand for ensuring a storage space in a door, for the convenience of fastening a bolt, or for another purpose.

Patent Literature 1 describes a method of: press-forming an end of a door beam comprising an aluminum alloy extruded member; buckling a pair of webs outward; opening a bolt hole in the center of the press-formed part in a width direction; and attaching the door beam to an attaching portion of an inner panel with a bolt. In the door beam described in Patent Literature 1, press-forming is applied from an outer flange side toward an inner flange side.

Patent Literature 2 describes a method of, when an end of a door beam comprising an aluminum alloy extruded member is press-formed, curving or bending a pair of webs outward or inward beforehand or forming recesses inside or outside the paired webs so that both the paired webs buckle outward or inward symmetrically. In the example shown in FIG. 5 of Patent Literature 2, press-forming is applied from an outer flange side and an inner flange side toward the center between both the flanges.

Patent Literature 3 describes a method of press-forming an end of a door beam comprising an aluminum alloy extruded member and buckling a pair of webs outward. In the door beam described in Patent Literature 3, press-forming is applied from an outer flange side toward an inner flange side (refer to FIG. 10).

Patent Literature 4 describes a method of press-forming an end of a door beam comprising an aluminum alloy molded member (extruded member) having, in addition to an outer flange and an inner flange, an intermediate flange between both the flanges. Press-forming is applied from an outer flange side toward an inner flange side (refer to FIG. 3).

CITATION LIST

Patent Literature

Patent Literature 1: Japanese Unexamined Patent Application Publication No. Hei 9-58386
Patent Literature 2: Japanese Unexamined Patent Application Publication No. 2003-118367
Patent Literature 3: Japanese Unexamined Patent Application Publication No. 2003-252056
Patent Literature 4: Japanese Unexamined Patent Application Publication No. 2015-147490

SUMMARY OF INVENTION

Technical Problem

A door beam comprising an aluminum alloy extruded member is arranged between an outer panel and an inner panel of a vehicle door so that a longitudinal direction of the door beam may be directed in an anteroposterior direction of a vehicle body and both the ends are fixed to the inner panel by a joining means of bolt fastening, riveting, welding, or the like with or without a bracket interposed. As shown in FIG. 6A, a door beam 31 the ends of which are not press-formed, when a space at an attaching portion (gap between an outer panel 12 and an inner panel 13) is small, cannot increase the height W in a vehicle width direction and absorption energy at the time of collision reduces. This point applies also to a door beam 41 the ends of which are press-formed from an outer flange side toward an inner flange side as shown in FIG. 6B.

The present invention has been established in view of the problem of such a conventional door beam and an object of the present invention is to make it possible to accommodate a door beam having a height W in a vehicle width direction larger than a conventional door beam in a limited space between an outer panel and an inner panel of a door of a vehicle.

Solution to Problem

A door beam according to the present invention is characterized in that: the door beam comprises an aluminum alloy extruded member having an inner flange, an outer flange, and a pair of webs connecting them and has a plastic worked part pressed in a height direction of the webs at an end in a longitudinal direction; the webs buckle outward at the plastic worked part; and, at the plastic worked part, the outer flange is located at an original position and the inner flange is located at a position closer to the outer flange side than an original position. Meanwhile, a height direction of webs is a direction coinciding with a vehicle body width direction when a door beam is installed in a door.

Such a door beam installed in the vehicle door is: arranged between the outer panel and the inner panel of the vehicle door so that the outer flange may be directed outward in the vehicle body width direction and the longitudinal direction may be directed in an anteroposterior direction of a vehicle body; and fixed to the inner panel at the plastic worked part (end).

Such a door beam can be manufactured by press-forming an end of the aluminum alloy extruded member from the inner flange side toward the outer flange side.

Advantageous Effects of Invention

The door beam according to the present invention is likely to be stored in a limited storage space in a door even when the door beam has a height W in a vehicle width direction larger than a conventional door beam, because the inner flange of the plastic worked part is located at a position closer to the outer flange side than the original position by press-forming. Further, since the height W of the door beam in a vehicle width direction can be increased, absorption energy at the time of collision can be increased.

DESCRIPTION OF EMBODIMENTS

A door beam, a door beam attachment structure, and a method for manufacturing a door beam, those being the present invention, are explained hereunder in reference to FIGS. 1A to 5.

Figure 1A:
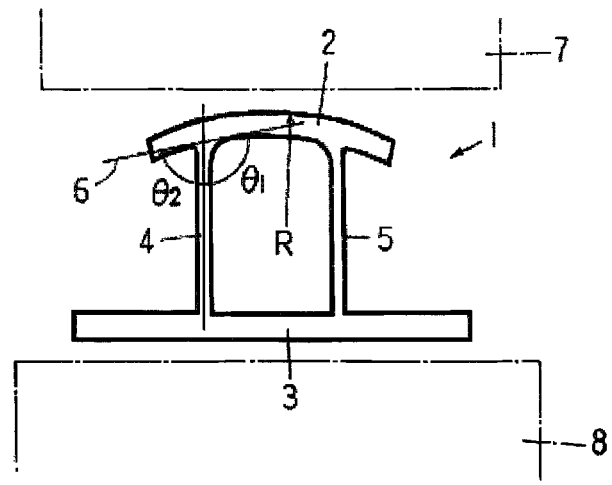
FIG. 1A is a sectional view of a door beam before press-formed according to the present invention.
Figure 2A:
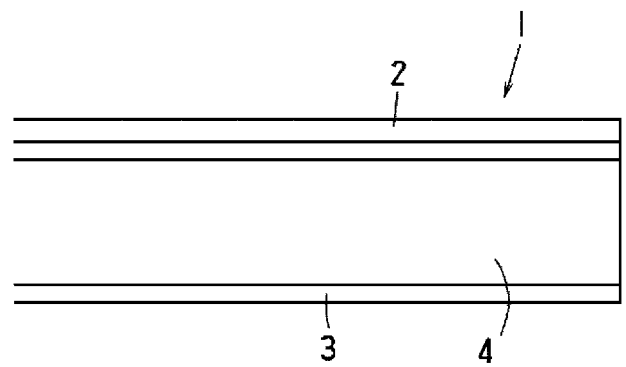
FIG. 2A is a plan view of the door beam before press-formed shown in FIG. 1A.

A door beam according to the present invention comprises an aluminum alloy extruded member and an example of a sectional shape and a planar shape of an aluminum alloy extruded member before press-forming (an aluminum alloy as extruded) is shown in FIGS. 1A and 2A. A door beam 1 (aluminum alloy extruded member): includes an outer flange 2, an inner flange 3, and a pair of webs 4 and 5 connecting both the flanges 2 and 3, those having uniform thicknesses respectively; and substantially has a bilaterally symmetrical shape.

The sectional shape of the outer flange 2 on a sectional plane perpendicular to a longitudinal direction: represents a part arranged outward in a vehicle body width direction when it is installed in a door; and convexly curves outward at a predetermined curvature (a curvature radius R of an outer periphery is 50 to 500 mm for example). The inner flange 3: has a tabular shape; and is a part arranged inward in a vehicle body width direction when it is installed in a door. The webs 4 and 5 have tabular shapes and are formed perpendicularly to the inner flange 3 and a height direction (vertical direction in FIGS. 1A and 2A) is directed nearly in parallel with a vehicle body width direction when the webs are installed in a door.

An angle formed by the outer flange 2 (tangent line 6) and each of the webs 4 and 5 at the inside corner of the place where the outer flange 2 and each of the webs 4 and 5 join is defined as $\theta 1$. Likewise, an angle formed by the outer flange 2 (tangent line 6) and each of the webs 4 and 5 at the outside corner of each of the same places is defined as $\theta 2$. The angles $\theta 1$ and $\theta 2$ have the relationship represented by $\theta 1 > \theta 2$.

An end or both the ends of the door beam 1 (aluminum alloy extruded member) is or are press-formed in a height direction of the webs 4 and 5. When an end of a door beam is press-formed by being interposed by upper and lower dies 7 and 8 respectively having planar machined surfaces for example, at the beginning of press-forming, the outer flange 2 is pressurized and starts to lower the curvature but the angles $\theta 1$ and $\theta 2$ do not so much change. As a result, a force to push the webs 4 and 5 toward the outside acts on the door beam 1 and the webs 4 and 5 buckle (deform curvedly) outward.

Figure 1B:
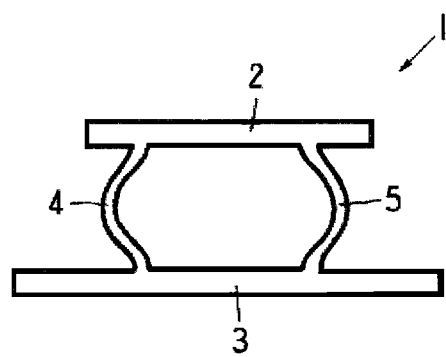
FIG. 1B is a sectional view of a door beam after press-formed according to the present invention.
Figure 2B:
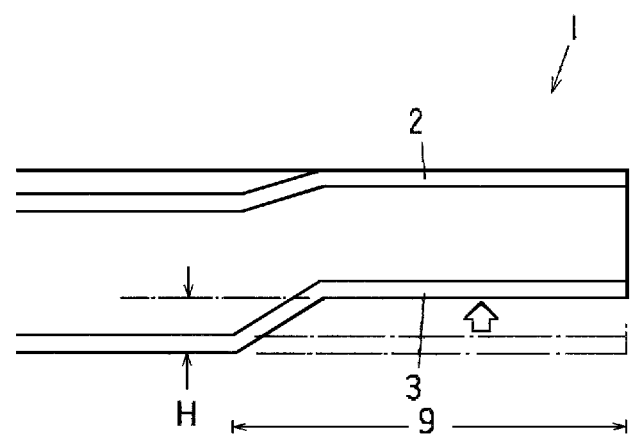
FIG. 2B is a plan view of the door beam after press-formed shown in FIG. 1B.

A sectional shape and a planar shape of the door beam 1 after press-formed are shown in FIGS. 1B and 2B. An outer flange 2 after press-formed has a smaller curvature than an original (before press-formed) curvature K or is flattened.

As shown in FIGS. 2A and 2B, press-forming is applied from the side of the inner flange 3 toward the side of the outer flange 2 in a height direction (vehicle body width direction) of the webs 4 and 5. The height of a press-formed region (plastic worked part 9) (dimension of the webs 4 and 5 in a height direction) is smaller than the height of the door beam 1 at a part other than the plastic worked part 9. In the press-formed region (plastic worked part 9), the inner flange 3: moves toward the side of the outer flange 2 by a distance identical to a press-form amount (height) H caused by press-forming; and is located at a position closer to the outer flange 2 than an original position (position of the webs 4 and 5 before press-formed in a height direction). In contrast, at the plastic worked part 9, the outer flange 2: has a smaller curvature than an original (before press-formed) curvature K or is flattened; but substantially does not move in a height direction; and is located at an original position (maintains an original height, in other words, the positions of the webs 4 and 5 in a height direction do not change between before and after press-forming).

Figure 3A:
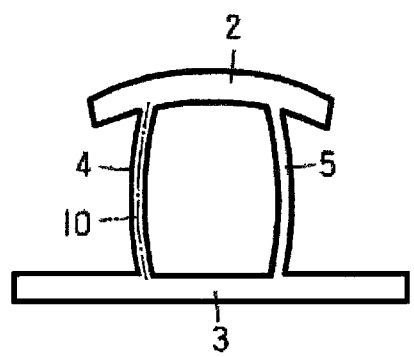
FIG. 3A is a sectional view of another door beam before press-formed according to the present invention.
Figure 3B:
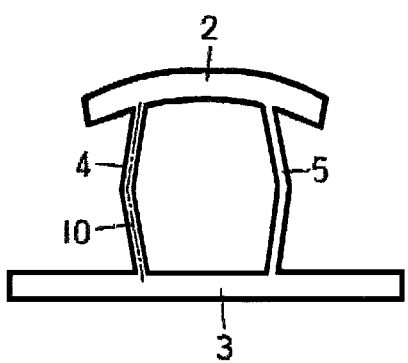
FIG. 3B is a sectional view of another door beam before press-formed according to the present invention.

Other sectional shapes (before press-formed) of door beams of the same type (an outer flange 2 curves convexly) as the door beam 1 shown in FIGS. 1A to 2B are shown in FIGS. 3A and 3B. A pair of webs 4 and 5 of a door beam (aluminum alloy extruded member) curve outward in FIG. 3A, a pair of webs 4 and 5 of a door beam bend outward in FIG. 3B, and, in each of the cases, a center line 10 (shown by an alternate long and short dash line) in each of the webs 4 and 5 projects outward. The center line 10 is a center line (line passing through a center in a width direction) of each of the webs 4 and 5 that is drawn in a height direction of the webs 4 and 5.

In the door beam shown in each of FIG. 3A and FIG. 3B, similarly to the door beam 1, since a pair of webs 4 and 5 project outward, the webs 4 and 5 are likely to buckle outward during press-forming. Further, at collision, both the webs 4 and 5 are inhibited from falling in a transverse direction and buckling inward and energy can be absorbed stably (robustness at collision improves).

Meanwhile, as other examples of a form of projecting the center line of a web drawn in a height direction outward, the forms shown in FIGS. 2(b) to 2(d) of Patent Literature 2 can be cited. In FIG. 2(b) of Patent Literature 2: the inner surfaces of both webs are formed perpendicularly to both flanges; the outer surfaces project nearly at the middle in a height direction; and the thicknesses of the webs in a width direction increase there. In FIG. 2(c) of the same literature: the outer surfaces of both webs are formed perpendicularly to both flanges; the inner surfaces retract toward the centers in a height direction; and accordingly the webs come to be thinner toward the centers. In FIG. 2(d) of the same literature: the inner and outer surfaces of both webs are perpendicular to both flanges; but notch-shaped recesses are formed on the inner surfaces at the centers in a height direction; and the portions are thinner.

Figure 4A:
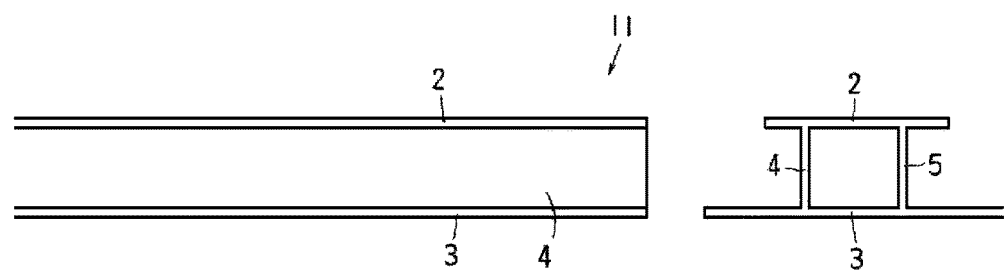
FIG. 4A shows a plan view and a sectional view of still another door beam before press-formed according to the present invention.
Figure 4B:
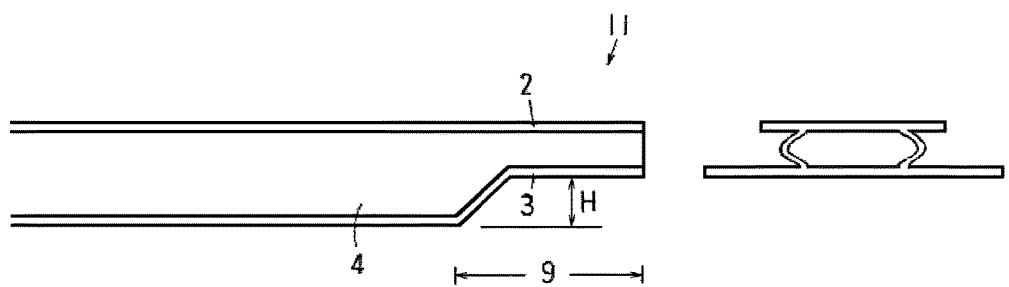
FIG. 4B shows a plan view and a sectional view of still another door beam after press-formed according to the present invention.

Still other door beams according to the present invention are shown in FIGS. 4A and 4B. Each of the door beams comprises an aluminum alloy extruded member and a planar shape and a sectional shape of the aluminum alloy extruded member before press-formed (aluminum alloy as extruded) are shown in FIG. 4A. A door beam 11 (aluminum alloy extruded member): includes an outer flange 2, an inner flange 3, and a pair of webs 4 and 5 connecting both the flanges 2 and 3, those having uniform thicknesses and tabular shapes respectively; and substantially has a bilaterally symmetrical shape.

As shown in FIG. 4B, an end or both the ends of the door beam 11 (aluminum alloy extruded member) is or are press-formed. press-forming is applied from the side of the inner flange 3 toward the side of the outer flange 2 in a height direction of the door beam 11 (aluminum alloy extruded member). The webs 4 and 5 buckle (deform curvedly) outward by the press-forming. As a result, in a press-formed region (plastic worked part 9), the inner flange 3 moves toward the side of the outer flange 2 by a distance identical to a press-form amount (height) H caused by press-forming and is located at a position closer to the side of the outer flange 2 than an original position. In contrast, at the plastic worked part 9, the outer flange 2: substantially does not move in the height direction; and is located at the original position (maintains an original height).

Figure 5:
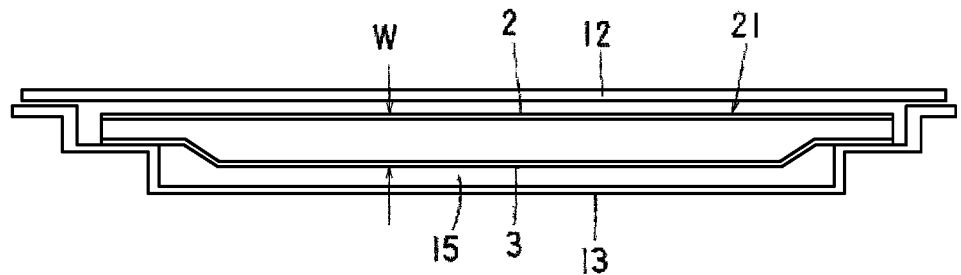
FIG. 5 is a plan view showing an attachment structure of installing a door beam the ends of which are press-formed from an inner flange side toward an outer flange side in a storage space in a vehicle door (between an outer panel and an inner panel).

A door beam according to the present invention installed in a vehicle door is shown in FIG. 5. In FIG. 5, 12 represents an outer panel, 13 represents an inner panel, and 21 represents a door beam fixed to the inner panel 13. Similarly to the door beams 1 and 11, both the ends of the door beam 21 are press-formed from the side of an inner flange 3 toward the side of an outer flange 2. In the press-formed regions (plastic worked parts), the inner flange 3 of the door beam 21: moves toward the side of the outer flange 2 by a distance identical to a press-form amount (height) caused by press-forming; and is located at a position closer to the side of the outer flange 2 than an original position.

Figure 6A:
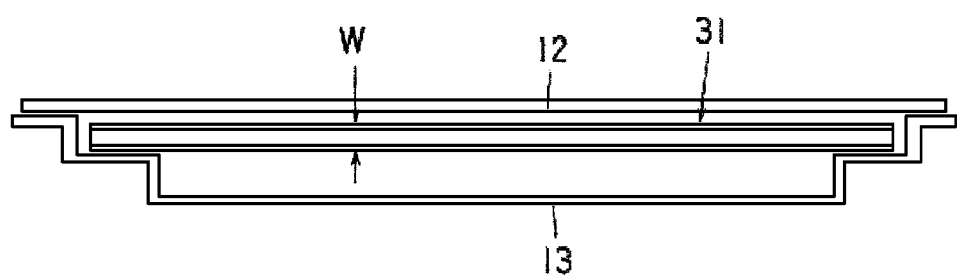
FIG. 6A shows an attachment structure of a conventional door beam the ends of which are not press-formed.
Figure 6B:
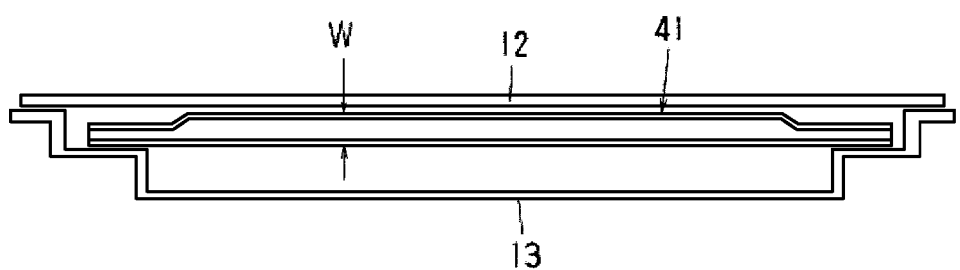
FIG. 6B is a plan view showing the attachment structure of the conventional door beam the ends of which are press-formed.

In the door beam 21 shown in FIG. 5, both the ends are press-formed and the heights of the ends in a vehicle width direction are small. As a result, the door beam 21 is not hindered from being attached to the inner panel 13 even when a space of an attaching portion in a door is small. Further, the height of a center part (other than both the ends) in a vehicle width direction is large, but the center part protrudes only toward the inside in a vehicle width direction, and hence the door beam 21 can be accommodated in a space 15 on the side of the inner panel 13 without difficulty. In this way, the door beam 21 can be installed in a limited space in a door even when a height W in a vehicle width direction is large. As a result, an energy amount absorbed by the door beam 21 can be increased or more weight reduction than a conventional door beam (refer to FIGS. 6A and 6B) can be materialized when an energy absorption is the same.

Meanwhile, although the door beam 21 shown in FIG. 5 is a bracketless door beam, the present invention can apply also to a bracket-attached door beam (type of being fixed to an inner panel with a bracket interposed).

LIST OF REFERENCE SIGNS 1, 11, 21 Door beam
2 Outer flange
3 Inner flange
4, 5 Web
7, 8 Upper and lower dies for press-forming
9 Press-formed part (plastic worked part)
12 Door outer panel
13 Door inner panel

The invention claimed is:

1. A door beam, comprising:
an inner flange extending in a longitudinal direction;
an outer flange extending in the longitudinal direction and facing the inner flange at a distance from the inner flange; and
a pair of webs connecting the inner flange and the outer flange,
wherein the inner flange has an end portion in the longitudinal direction which is made closer to an end portion of the outer flange such that the distance between the inner and outer flanges at the end portions is shorter than the distance at other portions of the inner and outer flanges.

2. A door, comprising:
an inner panel;
an outer panel; and
the door beam of claim 1 positioned between the inner panel and the outer panel,
wherein the door beam of claim 1 is positioned such that the outer flange faces the outer panel and has the longitudinal direction directed in an anteroposterior direction of a vehicle body, and that the end portion of the inner flange is fixed to the inner panel.

3. A method for manufacturing a door beam, comprising:
preparing an aluminum alloy extrusion including an inner flange extending in a longitudinal direction, an outer flange extending in the longitudinal direction and facing the inner flange at a distance from the inner flange, and a pair of webs connecting the inner and outer flanges; and
shaping the aluminum allow extrusion such that an end portion of the inner flange in the longitudinal direction is made closer to an end portion of the outer flange, and that the distance between the inner and outer flanges at the end portions is made shorter than the distance at other portions of the inner and outer flanges.

4. The method of claim 3, wherein the preparing of the aluminum alloy extrusion produces the aluminum alloy extrusion having the inner and outer flanges parallel to each other, and the pair of webs being directed perpendicular to the longitudinal direction.

5. The method of claim 3, wherein the shaping comprises pressing the end portion of the inner flange toward the end portion of the outer flange.

6. The method of claim 4, wherein the shaping comprises pressing the end portion of the inner flange toward the end portion of the outer flange.

7. The method of claim 3, wherein the shaping is performed such that the pair of webs deforms outwardly in a curved shape.

8. The method of claim 4, wherein the shaping is performed such that the pair of webs deforms outwardly in a curved shape.

9. The method of claim 6, wherein the shaping is performed such that the pair of webs deforms outwardly in a curved shape.

10. The method of claim 3, wherein the inner and outer flanges each have a uniform thickness.

11. The method of claim 4, wherein the inner and outer flanges each have a uniform thickness.

12. The method of claim 6, wherein the inner and outer flanges each have a uniform thickness.

13. The door beam of claim 1, wherein the inner and outer flanges each have a uniform thickness.

14. The door beam of claim 1, wherein the pair of webs is directed perpendicular to the longitudinal direction.

15. The door beam of claim 13, wherein the pair of webs is directed perpendicular to the longitudinal direction.

16. The door beam of claim 1, wherein the pair of webs is curved outwardly away from each other.

17. The door beam of claim 13, wherein the pair of webs is curved outwardly away from each other.

18. The door of claim 2, wherein the inner and outer flanges each have a uniform thickness.

19. The door of claim 18, wherein the pair of webs is directed perpendicular to the longitudinal direction.

20. The door of claim 18, wherein the pair of webs is curved outwardly away from each other.

* * * * *